United States Patent [19]

Blodgett et al.

[11] Patent Number: 4,738,575

[45] Date of Patent: Apr. 19, 1988

[54] CONVERTIBLE AUTOMOBILE CARRIER

[75] Inventors: William W. Blodgett, Hudson; Donald D. Dawson, Uniontown; John J. Rodgers, Euclid, all of Ohio

[73] Assignee: Roberts Transportation Services, Inc., Akron, Ohio

[21] Appl. No.: 850,836

[22] Filed: Apr. 10, 1986

[51] Int. Cl.⁴ .............................................. B60P 3/08
[52] U.S. Cl. .................................. 410/29; 296/181; 410/26
[58] Field of Search ...................... 410/3, 4, 13, 14, 18, 410/24, 26, 29, 54; 105/372; 296/181, 182, 10

[56] References Cited

U.S. PATENT DOCUMENTS

| | | | |
|---|---|---|---|
| 2,022,376 | 11/1935 | Judd | 410/4 |
| 2,461,927 | 2/1949 | Schaldach et al. | 410/26 |
| 2,636,772 | 4/1953 | Bridge | 410/26 |
| 2,668,734 | 2/1954 | Bridge | 410/26 X |
| 4,343,401 | 8/1982 | Paulyson | 410/26 X |
| 4,357,047 | 11/1982 | Katz | 296/181 |

FOREIGN PATENT DOCUMENTS

| | | | |
|---|---|---|---|
| 2509166 | 11/1975 | Fed. Rep. of Germany | 410/24 |
| 1336257 | 11/1973 | United Kingdom | 410/26 |
| 1509405 | 5/1978 | United Kingdom | 410/26 |

Primary Examiner—David A. Scherbel
Assistant Examiner—Russell D. Stormer

Attorney, Agent, or Firm—Oldham, Oldham & Weber Co.

[57] ABSTRACT

A semitrailer is described which is capable of conversion between a general freight carrying mode, and an automobile carrying mode. The floor of the semitrailer, which forms a lower tier, is fabricated in a discontinuous shape comprising from the rear end to the front end of the semitrailer an angled section, a drop section, and a horizontal section, the angled section extending downward at an angle whose vertex is located at the rear end of the semitrailer. An upper tier is formed by track supporting members mounted on each sidewall of the trailer which can be pivoted downward from a storage position adjacent to the sidewall, to a horizontal position where the components of the members are connected to form a continuous supporting structure.

In the automobile carrying mode the track supporting members are deployed in their horizontal position, thereby permitting automobiles to be placed thereon in an upper storage tier. An inclined plane adjacent to the drop section permits an automobile to be subsequently placed on the lower tier, next to the front end of the semitrailer, with additional automobiles thereafter placed behind.

In the general freight carrying mode, the track support members are pivoted to their storage position, thereby allowing the entire space within the semitrailer to be used for general freight.

6 Claims, 5 Drawing Sheets

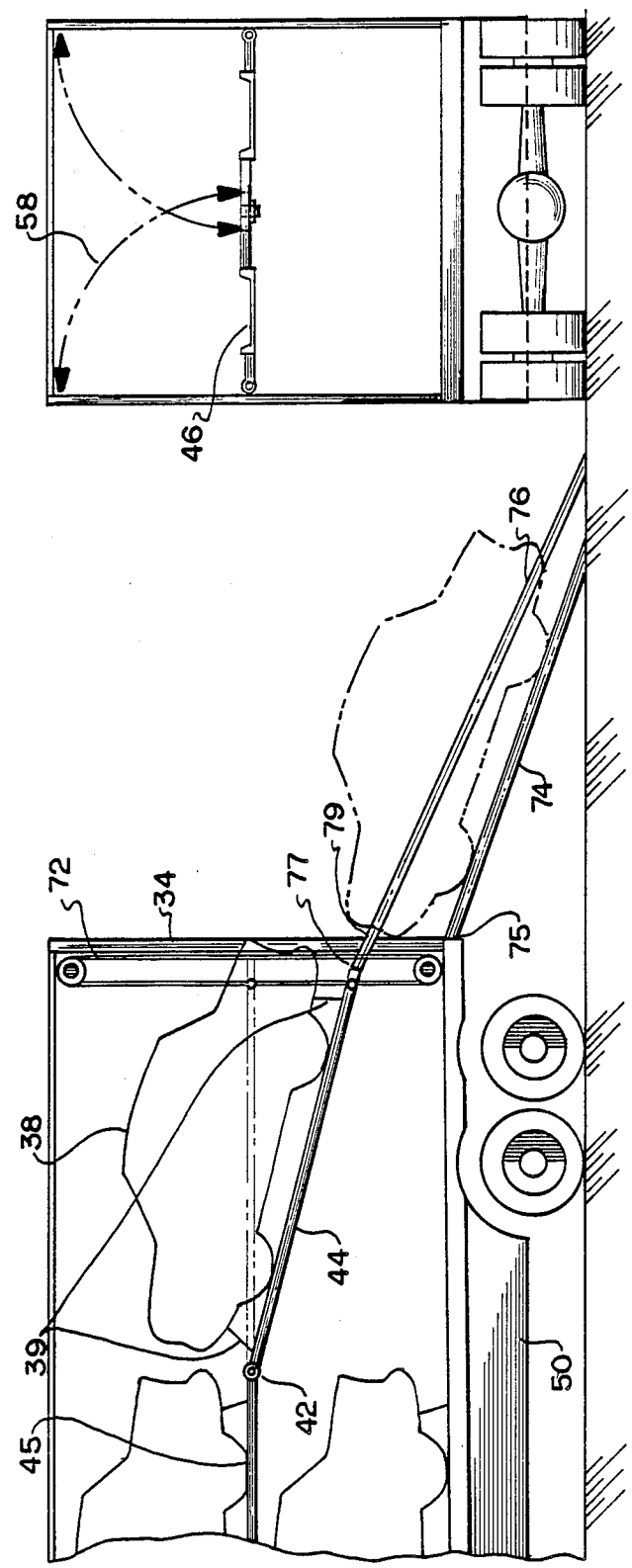

CONVERTIBLE AUTOMOBILE CARRIER

TECHNICAL FIELD

This invention relates to a truck adapted to transport wheeled vehicles. More particularly, this invention relates to a type of truck known in the Industry as a tractor-trailer, or a semitrailer, which is equipped to transport automobiles. Specifically, this invention relates to a semitrailer truck which can be converted from one carrying mode to another carrying mode, so as to have the capability of transporting either automobiles or general freight, whichever is desired.

Semitrailers are presently used throughout the world to transport freight of all kinds and description. In addition to being economical to operate, and having the capability of carrying a wide range of freight, such semitrailers are particularly valued for their versatility in that they are capable of servicing most freight transfer needs wherever roads exist for their movement. It is this latter capability which puts them at a distinct advantage relative to railed freight, particularly where the distance involved is not unduly long, for example, under six hundred miles.

One problem which freight movers, including those operating trucks, have always had to contend with, however, is the problem of finding loads to replace freight delivered to its destination. In this regard, it is not at all uncommon for truck operators, particularly those operating specialized trucks, to be unable to find a return load at a destination, necessitating empty travel to a location where additional freight can be found. Traveling empty, or dead-heading as empty travel is called, is obviously both expensive and time-consuming and a great amount of effort is spent by the trucking industry in scheduling to minimize the problem. While scheduling adjustments cannot always eliminate empty travel, obviously the more versatile the truck, the greater the variety of freight that can be handled, and the easier it is to find back-hauls.

BACKGROUND ART

A considerable amount of freight, particularly automobile parts and related items, have always been required in automobile manufacturing areas, of which Michigan is but one example. While many of these areas require a large amount of items delivered to them, to an important degree, the freight from such areas consists mainly of automobiles. Unfortunately, the commercial transport of automobiles moved by truck presently requires specialized vehicles specifically designed for automobile transport, since automobiles cannot normally be accomodated by standard semitrailer trucks, particularly in efficient quantities.

U.S. Pat. No. 2,432,228, for instance, shows a tandem trailer specially designed to carry automobiles. In the trailers taught by the patent, the automobiles are loaded onto a top platform, with additional automobiles being loaded on a deck beneath them. The top platform poses a serious impediment to hauling general freight, however, greatly reducing the versatility of the truck.

The back-haul problem is, therefore, actually compounded by the use of specialized trucks in that they themselves must return empty, once they have delivered a load of automobiles to its destination.

Much thought has been devoted to solving the back-haul problem, and in the case of truck deliveries to automobile manufacturing areas, for example, there have been attempts to design trucks that can accommodate both automobiles, as well as general freight.

U.S. Pat. No. 3,043,454, is an example of an attempt to construct a semitrailer truck that is capable of carrying automobiles, as well as general freight. To accomplish this, the patent teaches the use of an elevating mechanism which raises the automobiles initially placed in the truck to an overhead position. Following overhead loading, additional automobiles may be placed under those suspended by the elevating mechanism. Presumably, when the truck is to be used for carrying general freight, the elevating mechanism is raised out of the way, to a location near the top of the truck.

While the mechanism of the invention is ingenious, it is also complex, and greater cost and complexity. In addition, the loading and unloading producedures attendant to storing automobiles in the upper part of the truck would demand considerable skill for their successful accomplishment, presenting significant opportunities for mistakes and the possibility of serious consequences, both in terms of physical injury and property damage in the event of mischance.

The problem of designing a truck capable of handling both general freight and automobiles has also been greatly compounded by the fact that federal and state highway regulations impose strict limitations on the external dimension of semitrailer trucks operating over the nation's highways. At the same time, there has been increasing competition between the available forms of freight transportation, rail, air, and truck, forcing ever increasing efforts to improve efficiencies and lower ton-mile costs. This has led to such expedients as low profile tires to increase the volume of the cargo space within the practical dimensions, reductions in the clearance distance between truck bed and road, and similar expedients.

While such design adjustments have helped considerably, they are limited by the very nature of semitrailer trucks. The top of the front end of a semitrailer, for example, is restricted as to available height by the regulations referred to, while the bottom of the front end must be high enough so that it will fit over the coupler of the tractor truck used to pull the semitrailer. The limited space available between the height of the top and the bottom of an ordinary semitrailer unfortunately in the case of most standard sized automobiles makes it impossible to position one automobile over another in the front of the semitrailer, as must be done if an automobile load is to be maximized.

Now, however, a method has been found by which a semitrailer can be constructed to permit the efficient transportation of automobiles.

The inventive design allows as many as six standard sized automobiles to be carried in a semitrailer, and yet permits the dimensions of the truck to comply with the limitations specified in the state and federal regulations referred to.

The semitrailer of the invention can with a minimum of effort, readily be converted from its automobile hauling mode to its general freight hauling mode, making it much more versatile and considerably alleviating the back-haul problem in automobile manufacturing areas.

The semitrailer of the invention can be relatively inexpensivly constructed, without any need for complex apparatus. Furthermore, the type of semitrailer contemplated by the invention is simple in design, and consequently assures increased reliability, lower maintainence, and longer life.

DISCLOSURE OF THE INVENTION

According to the invention, a semitrailer is provided with a discontinuous floor which, for a section of its length, extends downward from the horizontal at an angle whose vertex is located at the rear end of the semitrailer. The forward end of the angled section of the floor terminates in a vertical drop section, or bulkhead, which projects upward to the horizontal continuation of the floor extending to the front of the semitrailer.

In addition, longitudinal hinged automobile track support members are mounted on, and extend along each of the sides of the semitrailer from its front to its rear. The track support members are adapted to either be stored vertically, immediately adjacent to the trailer walls when not in use, or to swing downward to a deployed horizontal position in which the unhinged ends of the track support members, directly or indirectly, make contact with, and are secured to each other.

In the semitrailer's general freight carrying mode, the track support members are maintained in their stored position, leaving the entire inside of the trailer free for the storage of such freight.

In the semitrailer's automobile carrying mode, the track support members are swung downward into a horizontal position and secured together. Automobiles are then driven onto the track supporting members, three automobiles thereby being accommodated in an upper tier, one behind the other. Following loading of the upper tier as described, an additional automobile is first driven onto the lower tier, or bottom floor of the semitrailer, and moved to its front end. In the process, the front wheels of the automobile are propelled up an inclined plane adjacent to the bulkhead at the truck floor's point of discontinuity, to the point at which they rest on the horizontal section of the semitrailer's floor. At such point, the rear wheels of the automobiles are positioned on the angled portion of the floor. Two additional automobiles are then sequentially driven behind the first, bringing the semitrailer's load to its full complement of six vehicles.

BRIEF DESCRIPTION OF THE DRAWINGS

The invention will better be understood by reference to the following drawings in which:

FIG. 3 is an end view of the semitrailer, illustrating the manner of deploying the track support members;

FIG. 6 shows the method of loading automobiles into the upper and lower tiers of the semitrailer of the invention.

BEST MODE FOR CARRYING OUT THE INVENTION

Figure 1:
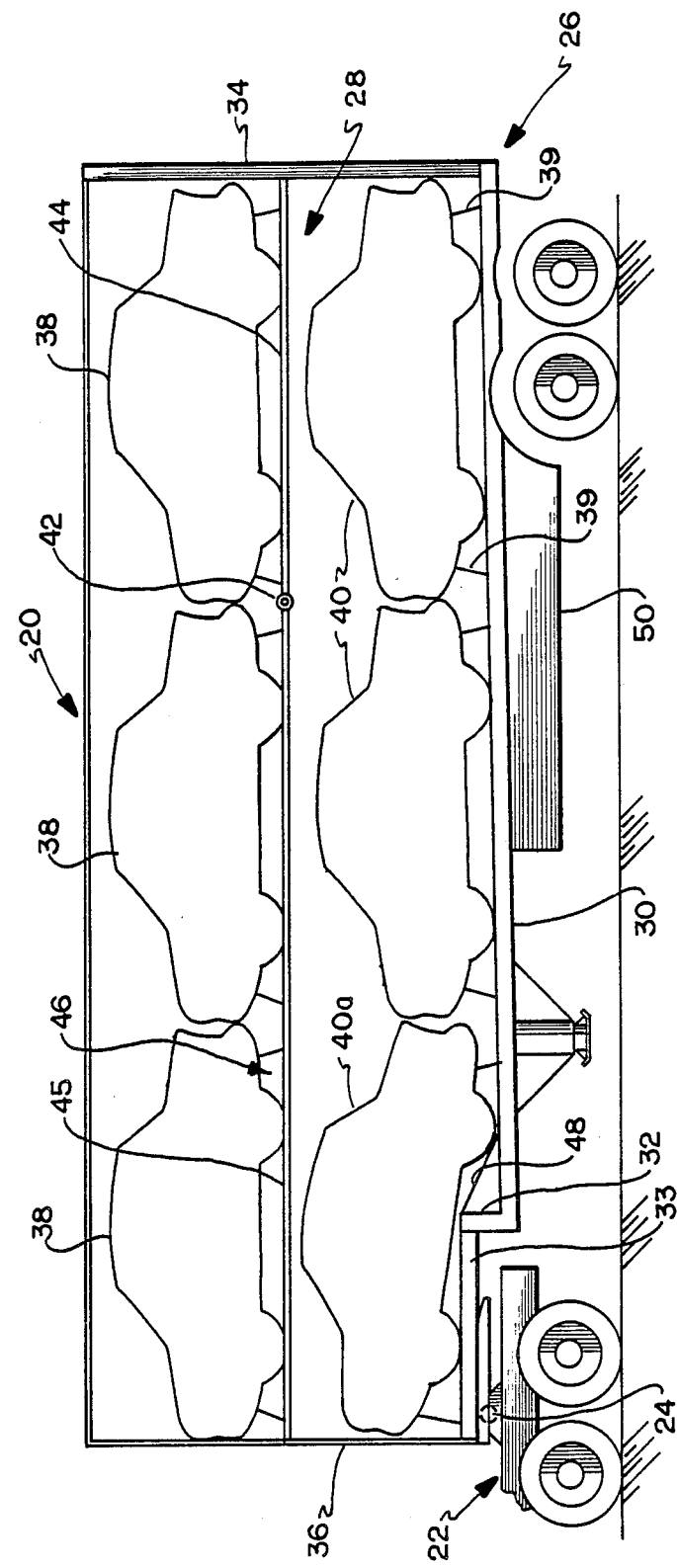
FIG. 1 is a cross-sectional view of a semitrailer designed according to the invention.

Referring now to the drawings:

FIG. 1 shows a semitrailer 20 of the invention having a front end 36, and a rear end 34, pulled by a tractor truck 22 by means of a pivotable coupler connection 24. The semitrailer comprises a lower automobile carrying tier 26 and an upper automobile carrying tier 28. The lower tier 26 comprises the semitrailer's discontinuous floor which is made up of a lower angled floor section 30, a vertical bulkhead, or drop section 32, and a horizontal floor section 33. An inclined plane section 48 is disposed adjacent to drop section 32 to facilitate movement of the front wheels of automobile 40(a) onto horizontal section 33.

Upper tier 28 comprises the track support members 46, which in the view shown include a section 44 being pivotable downward at an angle about a pivot point 42, and a non-pivotable section 45. In addition to automobile 40(a), the bottom tier 26 can accommodate additional automobiles 40, while the upper tier 28 is capable of supporting a number of automobiles 38. The automobiles are prevented from movement during transportation through use of tie-down means 39. Receptacle 50 provides storage space, among other things, for the accessory ramp or ramps used to load the semitrailer, and for a movable inclined plane section 48.

Automobiles stored on either tier 26 or tier 28 are secured to the surface on which they are placed by tie-down means 39, to prevent their unwanted movement during transportation. The tie-down means employed for this purpose may be any of those known in the art, for example straps, chains, webbing or the like fastened to the vehicles at each of their ends, and securely fastened to the surface on which the vehicles are placed.

Figure 2:
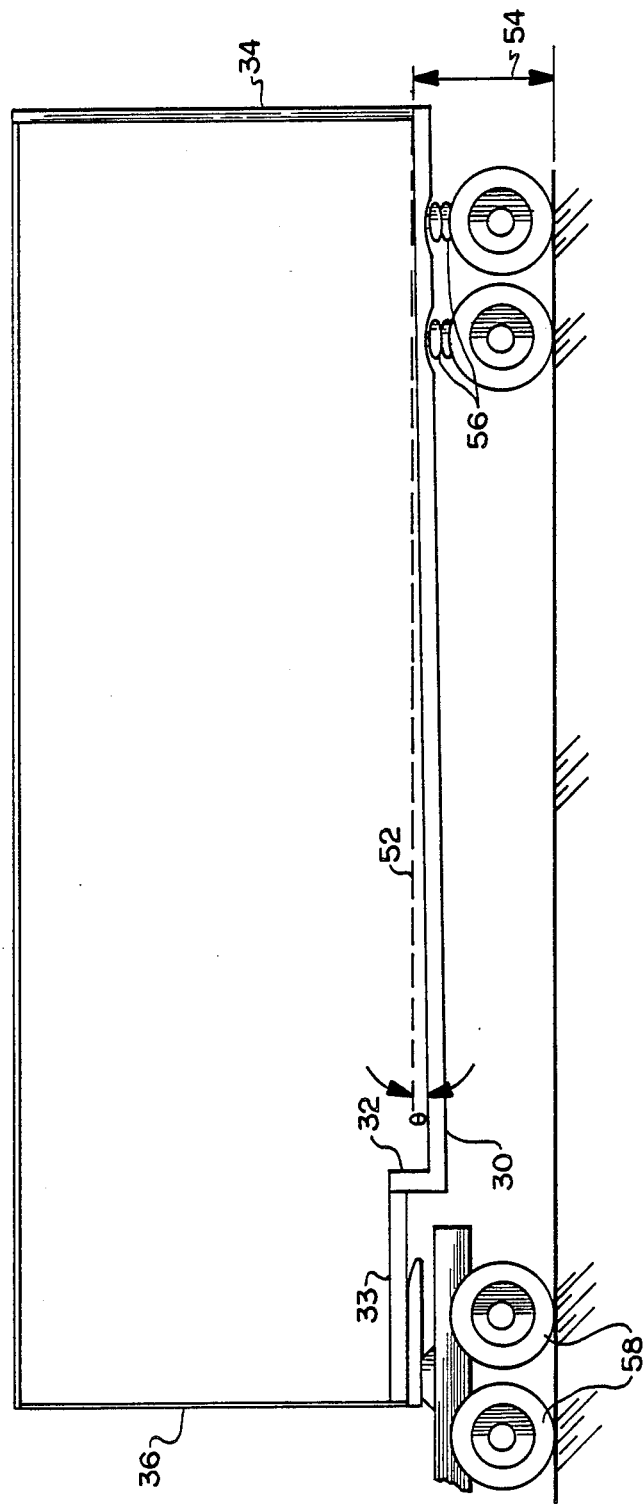
FIG. 2 is a schematic side elevation of a cross section, particularly showing details of the discontinuous floor of the semitrailer.

FIG. 2 illustrates the angled feature of the floor of the semitrailer design. In the Figure is shown angled floor section 30, which forms angle $\theta$ between an imaginary horizontal line 52 and angled floor section 30. The magnitude of the angle is determined by the length of angled floor section 30 and the height of the drop section 32. In semitrailers about 45 to 53 feet long, measured horizontally from front end 36 to rear end 34, the angled floor section 30 will typically be from about 38 to 43 feet long, while drop section 32 will be from about 4 to 24 inches high, and the horizontal floor section 33 will be from about 5 to 10 feet long.

The angle $\theta$ will depend upon the size of the automobiles to be transported, including such things as their height, length, and wheelbase. In the case of standard automobiles manufactured at the present time heights may, for example, be as much as about 60 inches, lengths up to about 221 inches and wheelbases up to about 115 inches. In such cases, it has been found that an angle, expressed in terms of the ratio of inches of height of drop section 32, per foot of length of angled floor section 30, of from about 0.2 to about 0.4 is well suited to the purposes of the invention, with the optimum angle ratio being in the neighborhood of about 0.3.

As previously stated, the discontinuity of the semitrailer floor results from the need to have sufficient vertical clearance between front wheels 58 and horizontal floor section 33. When the semitrailer is configured in its automobile carrying mode, it is necessary that provision be made for raising the front wheels of automobile 40(a) from angled floor section 30 to horizontal floor section 33. This is accomplished through provision of the inclined plane 48, which may be permanently affixed in position. It has been found advantageous, however, to have inclined plane 48 be movable so that when the semitrailer is used for carrying general freight, the inclined plane can be removed, and if desired stored in receptacle 50. Such removal facilitates the freight pallet loading with forklift trucks, in that such trucks can proceed as far forward in the semitrailer as drop section 32, while maintaining their fork lifting apparatus in a substantially horizontal position. This makes it possible to load pallets onto horizontal floor section 33 with far greater ease than might otherwise be possible.

Much of the general freight transported is loaded on pallets; consequently, it is essential that angled section 30 have a substantially flat, continuous floor, disposed at such an angle as to permit operation of forklift trucks thereon.

FIG. 2 also shows an elevating device 56, which may be air actuated, and which is useful in adjusting the height 54 of the rear end 34 of the semitrailer from the ground, in order to accommodate different loading situations, for example, different loading-dock heights.

FIG. 3 is an end view of the semitrailer of the invention showing the deployment 58 of track support members 46 from their storage position to their position of use, when the semitrailer is to be used for transporting automobiles.

Figure 4:
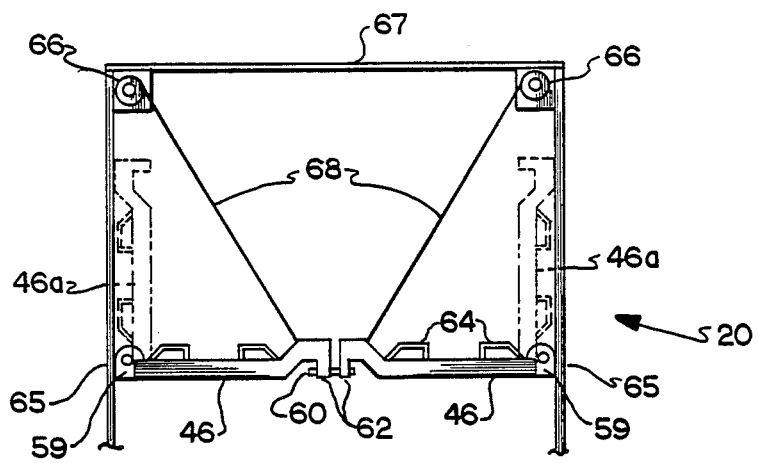
FIG. 4 is an enlarged partial end view of the semitrailer of the invention showing one design of the track support members.

FIG. 4 is an enlarged partial end view of the semitrailer showing the track support members 46 in their position of use in the automobile transporting mode, and a phantom view of the track support members 46(a) in their stored position when the semitrailer is to be used to transport general freight. In the Figure, the track support members 46 comprise optional stiffening members 64, which serve to stiffen the track support members, enabling them to better support the vehicles being transported. The stiffening members 64 may also serve as guideways for the wheels of the vehicles during the loading and unloading process. Track support members 46 extend from each side 65 of the semitrailer, and are fastened together at their point of contact in the center by fastening means, for example, connecting pins 60 which extend through holes in bracing flanges 62. The track support members 46 swivel about hinge blocks 59, and are raised and lowered when converting from one transport mode to another, for instance by cables 68, which are wound or unwound by winches 66.

An important advantage of track support members whose component parts form a continuous, supporting structure from one side 65 of the semitrailer to the other, is that such a structure is capable of supporting automobiles without the need of auxiliary supporting infrastructure. This eliminates the problems sometimes encountered from interference of such infrastructure with the storage space required for automobiles on the lower tier.

Figure 4A:
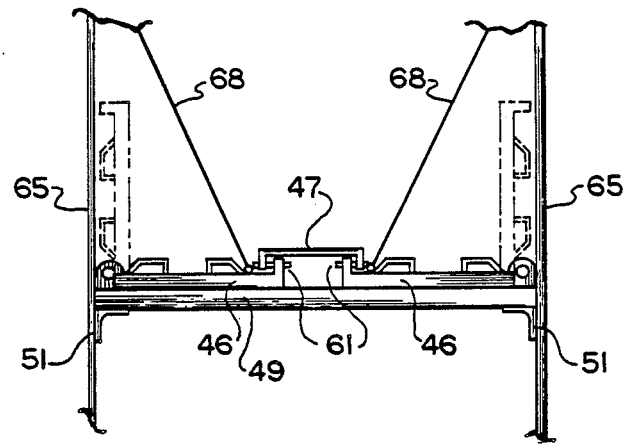
FIG. 4A is a partial end view of the semitrailer of the invention showing another design of the track support members.

Various configurations of track support members may be employed, as may be their method of center connection. FIG. 4A, for example, shows still another embodiment in which connecting plate 47 fastens track support members 46 to each other by means of connecting pins 61.

While FIG. 4 shows the use of winches to raise and lower the track support members 46, it will be appreciated that many different devices may be used, such as for instance, a block and tackle, chain fall, or other types of similar devices well known in the art.

While the track support members of the upper tier are capable of supporting automobiles placed upon them without additional bracing, it is sometimes desirable to use reinforcing means with the track support members, for example as a safety measure, or when a particularly heavy load is to be transported. Such reinforcment may be provided by movable joists 49 placed beneath the track support members 46 and supported on the semitrailer's walls 65 by fixtures 51 shown in FIG. 4A. It may also be provided by supporting cables extending from the walls 65, or top 67; by supporting brackets mounted on the walls beneath the track support members 46; by supporting pillars extending from the track support members 46 to the floor of the semitrailer, or by other means also well known in the art. In these instances, placement of such reinforcement means must be such as to avoid interference with the stored automobiles.

The numbers and locations of the track support member fastening means, and where used the reinforcing means, is arbitrary within engineering considerations practiced in the art.

Advantageously, the underside of the track support members 46 are designed so that no portion thereof projects downward below the horizontal line formed between the bottom of the hinge blocks 59. This avoids possible damage to automobiles stored on the first tier, and at the same time allows reinforcing members to be more easily placed beneath the track support members when such placement is desired.

Figure 5:
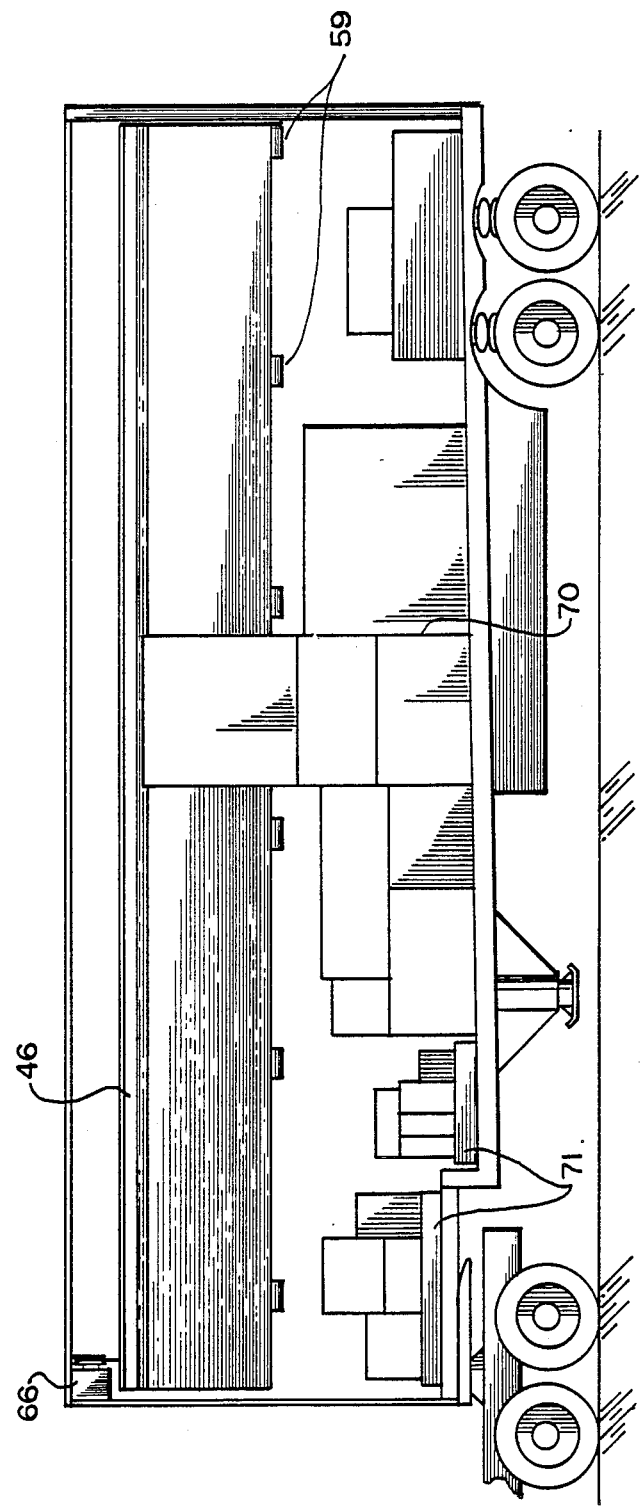
FIG. 5 is a cross sectional view of the semitrailer disposed to carry general freight with the track support member in its stored position.

FIG. 5 shows a semitrailer of the invention disposed in a general freight carrying mode. In the Figure, the track support members 46 have been swung on hinge blocks 59 to their upright, stored position adjacent to the semitrailer's walls by winch 66, thus accomodating general freight 70, some of which is shown loaded on pallets 71.

While the winch 66 is shown at the forward end of the semitrailer, it or some other lifting device, or devices, may be located elsewhere as well.

FIG. 6 illustrates the loading procedure of the semitrailer of the invention. In the Figure, a ramp 76, which may consist of two trough-like or similar members adapted to receive, guide, and support the wheels of the automobiles to be transported, are positioned so that at one end they are in contact with the ground, and at the other end they are in supported contact with the end of pivotal section 44 of the track support means.

In the illustration, pivotal section 44 has been swung downward around pivot point 42 at an angle which accommodates movement of the automobiles 38 up ramp 76, onto pivotal section 44, and into the semitrailer. When the last of the automobiles 38 destined for the upper tier has been moved onto pivotal section 44 and secured to it by tie-down means 39, the pivotal section is raised to its horizontal position, for example, by means of a hoist 72. Ramp 76, or a different but similar ramp 74 is then placed in position, and the lower tier is loaded.

Ramp 76 is supported at its upper end during the loading procedure either by temporary attachment to pivotal section 44 at point 77, or by supporting means attached to the rear end of the semitrailer in the area of point 79. The pivotal section can be raised or lowered by any of the well known lifting devices such as pneumatic cylinders, or by hoists, including such devices as chain falls, blocks and tackles, pulleys, and the like.

Ramp 76, or alternatively ramp 74, is attached to the floor of the semitrailer at point 75 during loading of the lower tier. Attachment of either ramps 74 or 76 can be accomplished through use of means known to the art, such as hooks, brackets and pins, or others.

Ramps 74 and 76 may be straight members. Alternatively, however, they may be curved so that ascent or descent can be accomplished without an abrupt angular change of direction. At times other than during the loading process, the ramps used in the loading and unloading procedure may if desired, be stored in receptacle 50.

Modifications of the loading procedure are readily possible. For example, pivotal section 44 could consist of an independant, rather than a pivotal section, lifted in the manner of an elevator to the upper tier after being loaded at floor level on the lower tier. Another possibility would be to have the non-pivoting section 45 extend to the rear end 34 of the semitrailer, at which point a loading ramp similar to ramps 74 and 76 could be located.

Furthermore, the semitrailer might be loaded by fixed ramp structures available at the loading and unloading locations, as opposed to movable ramps such as 74 and 76.

From the preceding, it will be apparent that the herein disclosed invention may be practiced with other changes and modifications in design, without departing from the scope or spirit of the invention.

What is claimed is:

1. A semitrailer with the capability of conversion between a general freight carrying mode and an automobile carrying mode, having upper and lower freight carrying tiers, and having an enclosed top, a rear end equipped with doors, and a closed front end, said lower tier consisting of a discontinuous floor means having:
    a horizontal section;
    a drop section, and
    an angled section,
    said horizontal section being adjacent to said front end, and said angled section lying in a continuous plane extending from the bottom of said drop section to the rear end of said semitrailer above the semitrailer's rear wheels, whereby in the automobile carrying mode, the automobile adjacent to the front end is disposed to rest on said floor means with its front set of wheels higher than its rear set of wheels so as to provide clearance between said automobile and the upper tier, and
    said upper tier comprising track support members having a longitudinally straight surface mounted on each sidewall of said semitrailer, and pivotable therefrom between a first position adjacent to said sidewall, and a second, horizontal position,
    said track support members when displayed in their horizontal position form a continuous, supporting structure from one sidewall of the semitrailer to the other such sidewall, and wherein the end of the track support members nearest the rear end of the semitrailer are pivotable downward at an angle from the horizontal when said tracks support members are deployed in their horizontal position, thereby facilitating the loading of automobiles into said semitrailer,
    whereby when said track support members are disposed in said first position, the semitrailer is adapted to carry general freight, and when disposed in said second position, it is adapted to carrying automobiles.

2. A semitrailer according to claim 1 in which the horizontal, drop, and angled sections are of such dimensions, and so disposed, as to be capable of having two automobiles stored one over the other, immediately adjacent to the front end of said semitrailer.

3. A semitrailer according to claim 1 in which the angle of the angled section, when expressed in terms of the ratio of inches of the drop section, per foot of length of the angled floor section, has a ratio of from about 0.2 to about 0.4.

4. A semitrailer according to claim 1 in which fastening means are used to connect the track support member components together to form said continuous supporting structure.

5. A semitrailer according to claim 1 in which there is provided a removable inclined plane to facilitate the loading of automobiles on the lower tier thereof.

6. A semitrailer with an enclosed top having the capability of conversion between a general freight carry mode and an automobile carrying mode, with upper and lower freight carrying tiers, said lower tier consisting of a discontinuous floor having:
    a horizontal section;
    a drop section, and
    an angled section,
    said horizontal section being adjacent to said front end, and said angled section lying in a continuous plane extending from the bottom of said drop section to the rear end of said semitrailer above the semitrailer's rear wheels, and
    said upper tier comprising track support members having a longitudinally straight surface mounted on each sidewall of said semitrailer, and pivotable therefrom between a first position adjacent to said sidewall, and a second, horizontal position,
    whereby said lower freight carrying tier is adapted to carry general freight in the general freight carrying mode, and automobiles in the automobile carrying mode, and when said track support members are disposed in said first position, the semitrailer is adapted to carry general freight, and when disposed in said second position, it is adapted to carry automobiles.

* * * * *